United States Patent
Angelone et al.

(10) Patent No.: US 7,769,931 B1
(45) Date of Patent: Aug. 3, 2010

(54) METHODS AND SYSTEMS FOR IMPROVED VIRTUAL DATA STORAGE MANAGEMENT

(75) Inventors: Raymond Anthony Angelone, Norfolk, MA (US); Eric Duen, Southbridge, MA (US); Karunaker Chinthapatla, Marlborough, MA (US); Norman Kevin Elrod, Natick, MA (US); Daniel F. Ozone, Foxborough, MA (US); Vinh Herring Phan, Grafton, MA (US); Ritesh Shukla, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 179 days.

(21) Appl. No.: 11/675,397

(22) Filed: Feb. 15, 2007

(51) Int. Cl.
*G06F 13/12* (2006.01)
*G06F 7/00* (2006.01)

(52) U.S. Cl. .......................... 710/74; 710/15; 709/223; 709/224; 711/6; 711/154; 707/609; 707/693; 707/736; 707/737; 707/802; 707/803; 707/812

(58) Field of Classification Search ............... 710/74
See application file for complete search history.

(56) References Cited

U.S. PATENT DOCUMENTS

| | | | |
|---|---|---|---|
| 6,282,602 B1 * | 8/2001 | Blumenau et al. | 711/4 |
| 6,496,914 B1 | 12/2002 | Vook et al. | 711/170 |
| 6,640,278 B1 * | 10/2003 | Nolan et al. | 711/6 |
| 6,801,960 B1 | 10/2004 | Ericson et al. | 710/33 |
| 6,920,494 B2 * | 7/2005 | Heitman et al. | 709/223 |
| 6,950,871 B1 * | 9/2005 | Honma et al. | 709/226 |
| 7,096,331 B1 | 8/2006 | Haase et al. | 711/162 |
| 7,403,987 B1 * | 7/2008 | Marinelli et al. | 709/223 |
| 7,680,835 B2 * | 3/2010 | MacLaurin et al. | 709/248 |
| 2003/0179748 A1 * | 9/2003 | George et al. | 370/389 |
| 2003/0236944 A1 * | 12/2003 | Thompson et al. | 711/114 |
| 2004/0085974 A1 * | 5/2004 | Mies et al. | 370/406 |
| 2004/0218593 A1 * | 11/2004 | Hammons et al. | 370/386 |
| 2005/0273451 A1 * | 12/2005 | Clark et al. | 707/1 |
| 2006/0242382 A1 * | 10/2006 | Griess et al. | 711/170 |
| 2007/0038679 A1 * | 2/2007 | Ramkumar et al. | 707/200 |
| 2007/0189153 A1 * | 8/2007 | Mason | 370/216 |
| 2008/0021902 A1 * | 1/2008 | Dawkins et al. | 707/10 |
| 2008/0256323 A1 * | 10/2008 | Mopur et al. | 711/173 |

OTHER PUBLICATIONS

'IBM Tivoli Storage Area Network Manager' by IBM, copyright 2004.*

(Continued)

*Primary Examiner*—Henry W Tsai
*Assistant Examiner*—Steven G Snyder
(74) *Attorney, Agent, or Firm*—Daly, Crowley, Mofford & Durkee, LLP

(57) ABSTRACT

The capacity of a data storage management system may be increased with disclosed methods and systems. One method may increase the capacity of a data storage management system that polls a plurality of monitored elements in a data storage environment. The method includes creating a flag for a poll request and associating a first value for the flag with a first subset of the plurality of monitored elements. The method further includes interpreting a first poll request that includes the first value for the flag as directed to the first subset and interpreting a second poll request that does not include the first value for the flag as not directed to the first subset.

17 Claims, 3 Drawing Sheets

OTHER PUBLICATIONS

'IBM TotalStorage: Introducing the SAN File System' by Charlotte Brooks et al., IBM Redbooks, Aug. 2004.*

Oliveira et al., U.S. Appl. No. 10/810,988, entitled "System and Method for Managing Storage Networks and Providing Virtualization of Resources in Such a Network," filed Mar. 26, 2004.

Bopardikar et al., U.S. Appl. No. 09/608,521, entitled "Method and Apparatus for Implementing High-Performance, Scaleable Data Processing and Storage Systems," filed Jun. 30, 2000.

Asaro et al., ESG Lab Report, EMC Invista SAN Virtualization Platform, A Validation Study by ESG Lab, Feb. 2006, downloaded from <http://www.emc.com/analyst/analystview.jsp?id=366> on Feb. 14, 2007 (16 pages).

EMC Corporation, EMC White Paper, Networked Storage Virtualization, May 5, 2005, downloaded from <http://www.emc.com/techlib/abstract.jsp?id=1527&c=US&l=en> on Feb. 14, 2007 (10 pages).

EMC Corporation, EMC White Paper, EMC Virtual LUN Technology, A Detailed Review, Sep. 2006, downloaded from <http://www.emc.com/techlib/pdf/H1529.1_emc_virtual_lun_tech_wo_Idv.pdf> on Feb. 14, 2007 (15 pages).

EMC Corporation, EMC White Paper, Virtual LUNs, Applied Technology, Oct. 2006, downloaded from <http://www.emc.com/techlib/pdf/H2442_virtual_luns_applied_tech_wp_Idv.pdf> on Feb. 14, 2007 (12 pages).

* cited by examiner

METHODS AND SYSTEMS FOR IMPROVED VIRTUAL DATA STORAGE MANAGEMENT

FIELD OF THE INVENTION

The invention generally relates to management of volumes of data storage and related meta-data.

BACKGROUND OF THE INVENTION

Over time, computer systems tend to improve in terms of speed, reliability, and processing capability. Taking advantage of these improvements may require a computer system to process and store more and more data. A computer system that processes and stores large amounts of data may typically include one or more processors communicating through a data storage management system with shared data storage. The shared data storage may include an array that itself includes one or more storage elements, such as disk drives.

Mass Storage Systems (MSS) typically include an array of a plurality of disks with a data storage management system comprising software for monitoring the disks and making the data on the disks available. To improve the flexibility and versatility of Mass Storage Systems, MSS can include one or more networked arrays of a plurality of disks. Popular implementations of networks for MSS include network attached storage (NAS) and storage area network (SAN). NAS uses known TCP/IP lines such as Ethernet to access data through industry standard file sharing protocols like NFS, HTTP, and Windows Networking. A SAN allows the MSS to directly access data over Fibre Channel switching fabric through encapsulated SCSI protocols. Each MSS implementation has its advantages and disadvantages.

A SAN is particularly noted for providing the advantage of being reliable, maintainable, and having a scalable infrastructure. However, the SAN's complexity and disparate nature makes it difficult to manage centrally. Thus a problem encountered in the implementation of a SAN is that the dispersion of resources tends to create an unwieldy and complicated data storage environment. U.S. patent application Ser. No. 10/810,988—which was filed on Mar. 26, 2004, entitled "System and Method for Managing Storage Area Networks and Providing Virtualization of Resources in such a Network," and assigned to EMC Corporation of Hopkinton, Mass.—disclosed systems and methods for allowing unified management of the SAN. Additionally, EMC Corporation offers a software product that may be used to create a unified data storage management system—the INVISTA virtualization software product, version 1.0, release 2.

SUMMARY OF THE INVENTION

The inventors of the present invention recognized that some fixed components of SANs, such as processors and memory used by the data storage system, may contribute to SAN scale limitations. The inventors of the present invention, nonetheless, recognized that known data storage management systems do not take full advantage of variable elements of SANs. The inventors of the present invention recognized that the software architecture that support SANs is one variable element. The inventors further recognized that modifications to existing software architecture infrastructure may enable an increase in the capacity of a data storage management system. The inventors also recognized that such modifications may reduce SAN scale limitations.

Methods and systems are disclosed that relate to increasing the capacity of a data storage management system. One embodiment consistent with principles of the invention is a method for increasing the capacity of a data storage management system that stores attributes of a plurality of monitored elements in a data storage environment. This method includes creating a flag for a poll request and associating a first value for the flag with a first subset of the plurality of monitored elements. The method further includes interpreting a first poll request that includes the first value for the flag as directed to the first subset of monitored elements and interpreting a second poll request that does not include the first value for the flag as not directed to the first subset of monitored elements.

Another embodiment consistent with the principles of the invention is a method for dividing responsibility for polling a plurality of monitored elements in a data storage environment among modules in a data storage management system. The method includes creating a flag for a poll request and associating a first value for the flag with a first subset of the plurality of monitored elements. The first subset includes monitored logical elements. The method further includes interpreting a first poll request that includes the first value for the flag as applying to the first subset, and interpreting a second poll request that does not include the first value for the flag as not applying to the first subset.

Either of the foregoing embodiments can be implemented in computer readable program code. Such code can be stored on a computer usable medium. Such code can also be executed on a system consistent with principles of the invention.

A third embodiment consistent with the principles of the invention is a data storage management system that communicates with at least one host and at least one storage element. The system includes a switch between the at least one host and the at least one storage element. The system also includes a storage processor (SP) that manages the switch with layered modules. A first module in a management interface layer on the SP generates a first poll request including a first flag value. A second module in the management interface layer on the SP generates a second poll request that does not include the first flag value. A third module in a second layer associates the first flag value with a first plurality of monitored elements. The third module also interprets the first poll request as directed to the first plurality of monitored elements and interprets the second poll request as directed to a second plurality of monitored elements. The first and second layer may be in user space.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Reference is now made in detail to exemplary embodiments of the invention, examples of which are illustrated in the accompanying drawings. Wherever possible, the same reference numbers will be used throughout the drawings to refer to the same or like parts.

Figure 1:
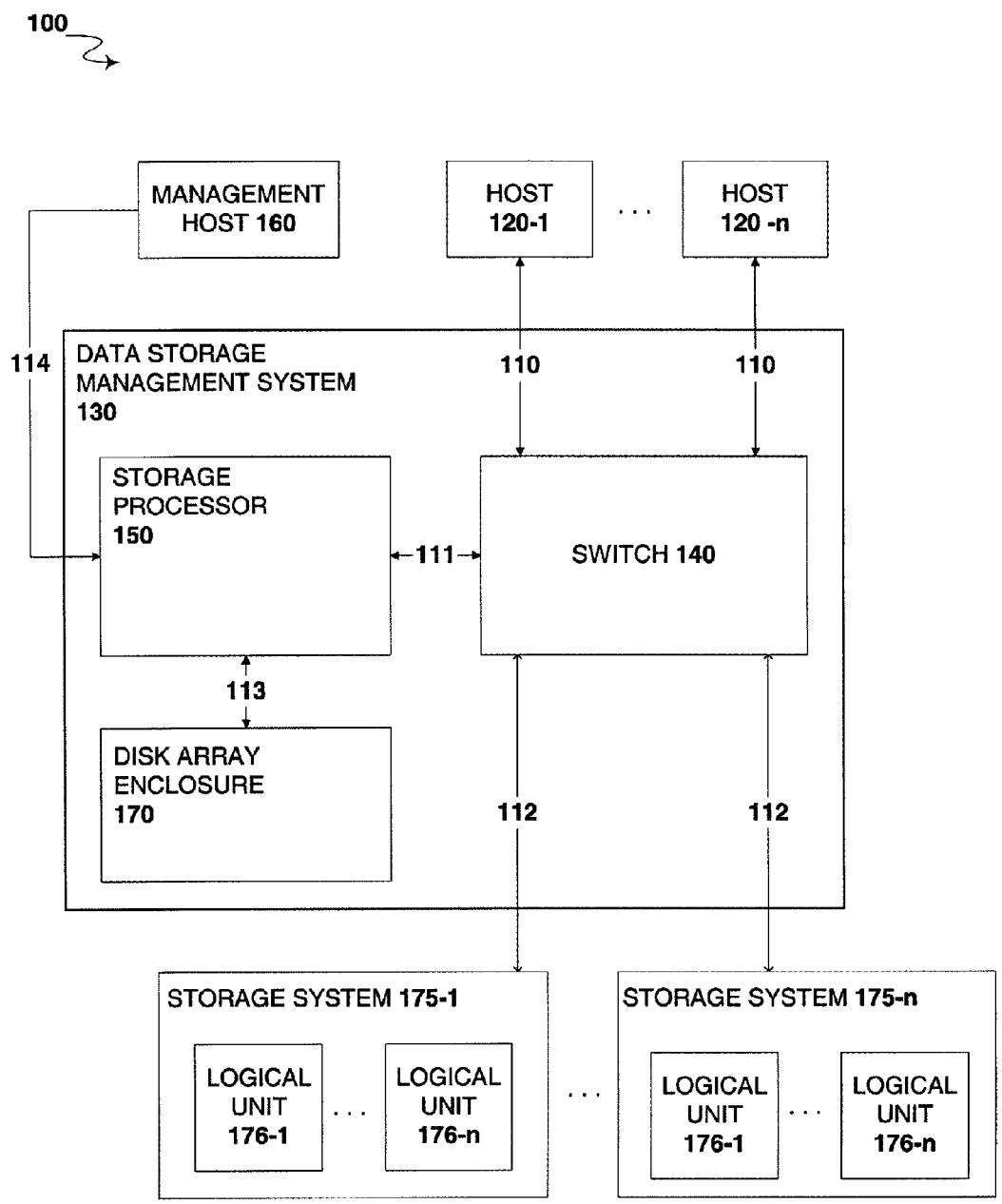
FIG. 1 illustrates an exemplary data storage environment, consistent with features and principles of the present invention.

FIG. 1 illustrates exemplary data storage environment 100 consistent with features and principles of the present invention. Environment 100 includes at least one host 120, a data storage management system 130, and at least one storage system 175. Host 120 sends I/O requests to data storage management system 130 to access data on the at least one storage system 175 that is available through the data storage management system 130. Host 120 also receives responses to its I/O requests from the at least one storage system 175 through the data storage management system 130.

Each storage system 175 provides persistent data storage using a plurality of storage elements 176-1, ..., 176-n. A typical storage element 176 is a SCSI logical unit (LUN), which may be composed of one or more disk drives or portion thereof. A storage system 175 may be sophisticated, such as a CLARIION data storage system available from EMC Corp., a TagmaStore data storage system available from Hitachi Data Systems Corp. of Santa Clara, Calif., a FAStT data storage system available from IBM, or a SYMMETRIX data storage system also available from EMC Corp. On the other hand, a storage system 175 may be simple, such as a JBOD configuration of disk drives. Different storage systems 175-1, ..., 175-n associated with data storage management system 130 need not be of the same type.

A network 110 enables communications between each host 120 and data storage management system 130. A network 112 enables communications between data storage management system 130 and each storage system 175. Two networks 111, 113 enable communication with components of data storage management system 130. Each network may be a Fibre Channel network, which may use encapsulated SCSI protocols. Each network may alternatively be one or more TCP/IP lines, which may use a known protocol such as NFS, HTTP, and Windows Networking. A network may alternatively be as simple as a dedicated physical connection. Different networks within data storage environment 100 may be of different types. For example, network 110 may be a Fibre Channel fabric whereas network 112 may be a TCP/IP fabric.

Data storage management system 130 presents a logical representation of the data storage capacity of the at least one storage system 175 to host 120. The data storage capacity presented to host 120 may not correspond to the physical characteristics of the at least one storage system 175. For example, the storage capacity of 15 disks may be presented to host 120 as a single disk. Additionally, data on the at least one storage system 175 may be configured to offer redundancy and other features likely to minimize data corruption. For example, data on storage system 175 may be consistent with a RAID configuration.

Data storage management system 130, in some embodiments, includes a switch 140, at least one storage processor 150, and at least one disk array enclosure 170. Switch 140 selectively enables communication between the at least one host 120 and the at least one storage system 175. Switch 140 may be, for example, an intelligent switch such as the Brocade AP7420 switch available from Brocade Communication Systems, Inc. or the MDS 9500 switch available from Cisco Systems, Inc. Storage processor 150 controls switch 140.

Data storage management system 130 may include more than one storage processor 150. When data storage management system 130 includes more than one storage processor 150, the storage processors may act as a cluster of storage processors. A plurality of storage processors in data storage management system 130 may share a load and/or offer some redundant functionality. For example, storage processor 150 may be two storage processors acting as a cluster. Storage processor 150 uses the at least one disk array enclosure 170 to store data that enables management of data stored on the at least one storage system 175. Such data is hereinafter referred to as meta-data. The meta-data includes data related to the storage characteristics of each storage system 175 available to host 120 through switch 140, data related to how data storage is presented to the at least one host 120, and attributes of elements in the data storage environment. Disk array enclosure 170 may be any storage device, or combination of memory devices, that provides fairly robust data storage over time. For example, disk array enclosure 170 may be an array of storage elements, such as disk drives.

Additionally, host 120 may be used to manage data storage management system 130. To do so, host 120 sends management I/O requests to the at least one storage processor 150. The management I/O requests may take the form of command line interface (CLI) I/O requests or graphical user interface (GUI) I/O requests. An exemplary management I/O request is a request for the state of a component of the data storage management system 130. Accordingly, host 120 may be used both to manage system 130 and to access data at least one storage system 175. If appropriate, a network may enable communication between storage processor 150 and host 120, not via switch 140. Alternatively, a management host 160, which is not used to access data on the at least one storage system 175, may be used to manage data storage management system 130. A network 114 may enable communication between storage processor 150 and management host 160. Network 114 may be any of the types described above. For example, network 114 may be a TCP/IP connection. The remainder of the detailed description presumes an implementation in which management host 160 is used to manage data storage management system 130.

Figure 2:
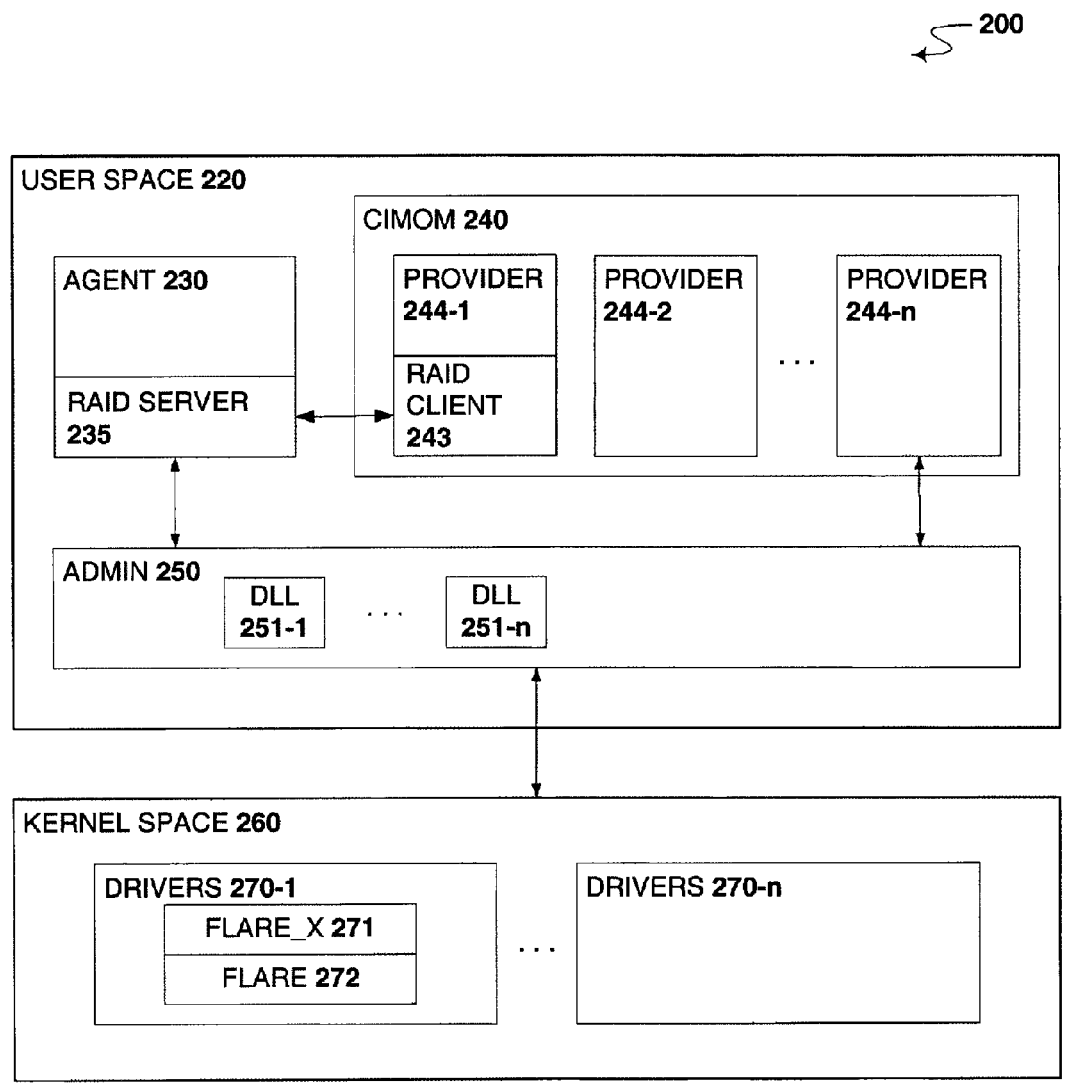
FIG. 2 illustrates an exemplary data storage management system in communication with exemplary hosts, consistent with features and principles of the present invention.

FIG. 2 illustrates exemplary processing module architecture 200 in storage processor 150, consistent with features and principles of the present invention. Architecture 200 is a layered architecture that includes a user space 220 and a kernel space 260. User space 220 receives management I/O requests from host 160 and interprets them so that they can be processed by kernel space 260. Kernel space 260 includes the core modules for the storage applications. These modules perform space memory management, process and task management, and disk management. User space 220 communicates with kernel space 260 using IOCTL or any other appropriate protocol.

User space 220 is further separated into a management interface layer and an administration layer 250. The management interface layer includes an agent layer 230 and a CIMOM layer 240, which are peers. Agent layer 230 receives CLI management I/O requests from host 160. CIMOM layer 240 receives GUI management I/O requests from host 160. CIMOM layer 240 includes a provider 244-1 and may include additional providers 244-2, etc. Provider 244-1 may communicate with administration layer 250 via agent layer 230.

Each layer or module in user space 220 may communicate with other layers or modules using a different protocol. For example, CIMOM layer 240 may communicate with agent layer 230 using Rogue Wave Sockets. Similarly, management interface layer may communicate with administration layer 250 using flagged length data (FLD) protocol.

In an architecture in which provider 244-1 communicates with administration layer 250 via agent layer 230, any I/O request generated by provider 244-1 must be processed by provider 244-1 and agent layer 230. When architecture 200 is implemented to manage RAID management modules, provider 244-1 may have an associated RAID management client 243 and agent layer 230 may have an associated RAID management server 235. Accordingly, a poll request generated by provider 244-1, or its associated RAID management client 243, will be handled by both provider 244-1 and agent layer 230. Moreover, the meta-data in the resulting response will also be handled by both provider 244-1 and agent layer 230.

As previously noted, data storage management system 130 may monitor attributes of elements in the data storage environment and store such meta-data on disk array enclosure 170. The relevant attributes may include the configuration and/or state of monitored elements. Monitored elements may include, for example, each storage processor 150, each disk array enclosure 170, nondisruptive upgrade (NDU), each storage element, each virtual volume, and each virtual frame. This meta-data may be collected in various ways based on various triggers. For example, this meta-data may be collected by polling the monitored elements. A timer may trigger a poll every minute. Polls may, additionally or alternatively, be triggered by events such as management I/O requests.

Since any specific processor used as a storage processor will have a limited processing capacity, storage processor 150 may near its capacity when processing metadata associated with some number of elements monitored by data storage management system 130. Similarly, although less critically, since any specific disk array enclosure used as disk array enclosure 170 will have a limited storage capacity, disk array enclosure 170 will near its capacity attempting to store the metadata associated with some number of elements monitored by data storage management system 130. As disk array enclosure 170 nears its memory capacity, it will begin to page thereby degrading processing performance.

The inventors of the present invention recognized that the foregoing limitations may unnecessarily limit the performance and/or the capacity of data storage management system 130 to manage additional arrays or the data stored thereon. The inventors of the present invention further recognized that division of the meta-data, and its management and processing, into two or more independent groups may reduce, or even overcome, this capacity limitation. The inventors further recognized such division of meta-data management and processing may be done in either user space 220 or kernel space 260. For example, driver 271 and driver 272 in kernel space 260 may be modified to produce the division. An exemplary method and system for producing the division in user space 220 is described below.

Figure 3:
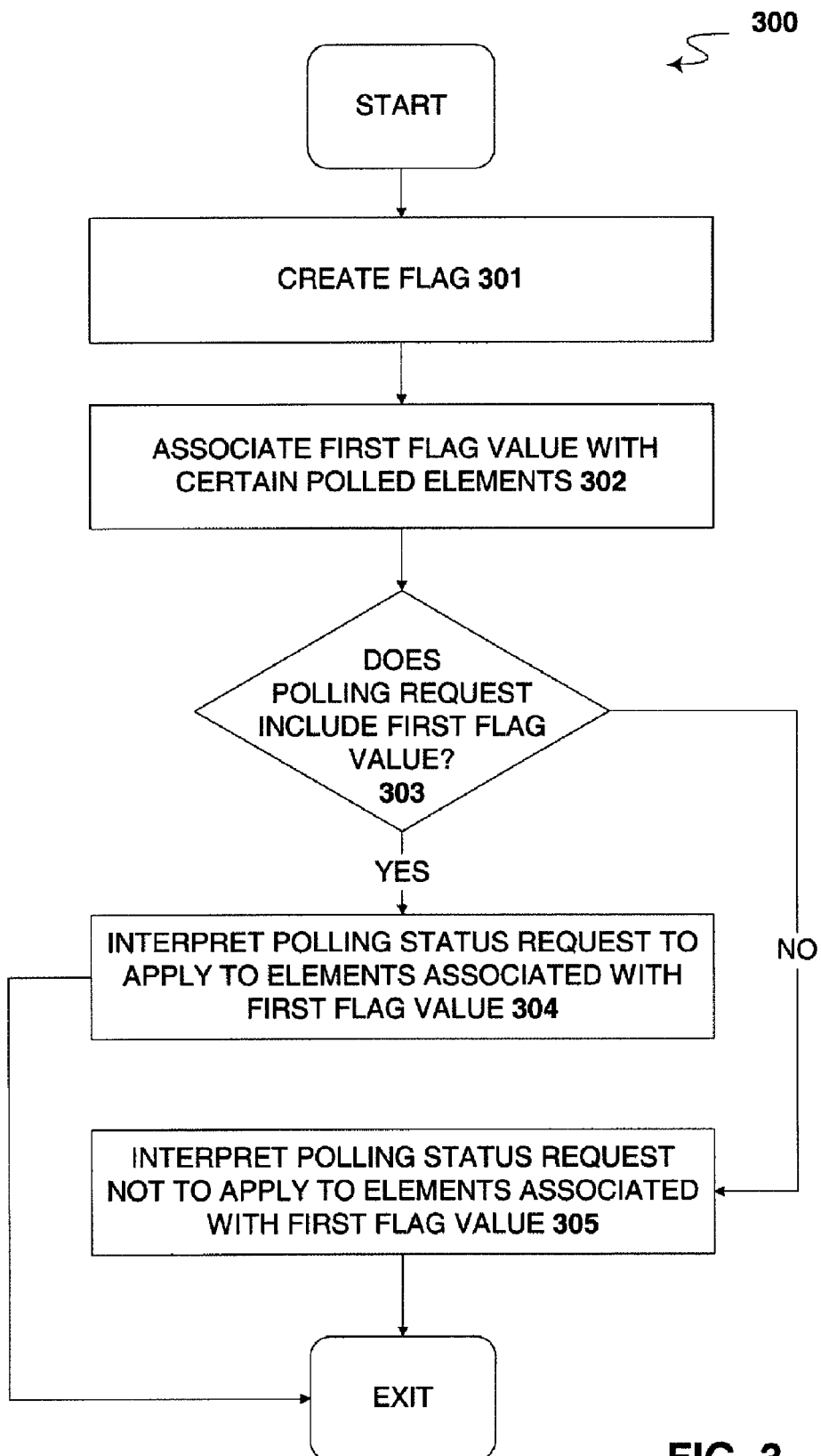
FIG. 3 illustrates an exemplary method for increasing the capacity of an existing data storage management system that polls a plurality of storage elements in a data storage environment, consistent with features and principles of the present invention.

FIG. 3 illustrates an exemplary method 300 for increasing the capacity of an existing data storage management system that monitors attributes of a plurality of storage elements in a data storage environment, consistent with features and principles of the present invention. In stage 301, a new flag for a poll request is created. Stage 301 may be implemented, for example, by adding a new provider 244-n to CIMOM layer 240. The new provider 244-n may be capable of directly communicating with administration layer 250. In this exemplary implementation of the invention, new provider 244-n generates a poll request with a new flag. More specifically, new provider 244-n generates a poll request including a new flag with a first flag value. New provider 244-n may generate such a poll request periodically, for example, whenever a timer indicates that a specified time interval has elapsed.

The trigger used by new provider 244-n to generate a poll request may differ from the trigger used by provider 244-1 to generate a poll request. For example, different time intervals may be specified for the two providers 244-1, 244-n.

In stage 302 of method 300, the first flag value is associated with certain elements monitored by data storage management system 130. For example, the first flag value may be one. Alternatively, the first flag value may be any non-null value. In this exemplary implementation of the invention, the first flag value is associated with elements monitored by data storage management system 130 in administration layer 250. The association may take advantage of existing unique identifiers of the monitored elements. In some embodiments of method 300, the first flag value is associated with monitored logical elements in the system. In some such embodiments of method 300, the first flag value is not associated with monitored physical elements in the system. For example, administration layer 250 may use a first range of unique identifiers to identify monitored physical elements in the system and a second range of unique identifiers to identify monitored virtual elements in the systems. In such a system, association of the first flag value with only the monitored virtual elements in the system may be done by associating the first flag value with the unique identifiers in the second range.

Alternative subsets of monitored elements within the system may be associated with the first flag value. A table or list may be used to associate the first flag value with individual monitored elements, for example, by unique identifier of monitored elements. Similarly, unique identifiers that are even or odd may be associated with the first flag value. Alternatively, striped ranges of unique identifiers may be associated with the first flag value. Method 300 may be particularly advantageous when the monitored elements associated the first flag value represent a significant portion of the total number of monitored elements.

In stage 303 of method 300, each poll request is checked to determine the value of the new flag. If a poll request includes the first flag value, in stage 304, it is interpreted to apply to elements associated with the first flag value. If a poll request does not includes the first flag value, in stage 305, it is interpreted not to apply to elements associated with the first flag value. For example, where the first flag value is one, a poll request whose flag includes any value other than one is interpreted in stage 305 as not applying to elements associated with the first flag value. Alternatively, where the first flag value is non-null, a poll request whose flag includes a null value is interpreted in stage 305 as not applying to elements associated with the first flag value. Similarly, where the first flag value is non-null, a poll request not having a flag is interpreted in stage 305 as not applying to elements associated with the first flag value.

As previously noted, an existing provider 244-1 or its associated RAID management client 243 may generate a poll request. Such a request may not include the new flag at all and so may be interpreted as simply not having the first tag value for the new flag. Alternatively, provider 244-1 or agent 230 may be modified to generate a poll request that includes a second flag value. In this exemplary implementation of the invention, new provider 244-n additionally generates a poll request with a new flag having the first flag value. Both types of poll requests are interpreted at administration layer 250.

In this exemplary implementation of the invention, administration layer 250 would interpret a poll request from new provider 244-*n* as applying to those monitored elements that are associated with the first flag value. Similarly, administration layer 250 would interpret a poll request from provider 244-1, which may include a null value for the new flag or a second flag value, as applying to those monitored elements that are not associated with the first flag value. In addition to interpreting a poll request based on the new flag, administration layer 250 may further interpret the poll request. Administration layer 250 may then pass a poll request directed at the appropriate elements to kernel space 260. Kernel space 260 may then respond by initiating the requested polling and returning the relevant response to administration layer 250.

The inventors of the present invention have recognized a significant increase in the data management capacity of a data storage management system 130 implementing method 300 in architecture 200 as described above. In a lab test, the inventors have almost doubled the data management capacity of architecture 200 by implementing the present invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   increasing capacity of a data storage management system using meta-data by:
   in a processor, defining a first plurality of meta-data including storage attributes stored in a memory associated with a first plurality of monitored elements;
   defining a second plurality of meta-data including storage attributes associated with a second plurality of monitored elements different from the first plurality of monitored elements;
   associating a first value with the first plurality of meta-data and a second value with the second plurality of meta-data;
   interpreting, at an administration layer of the data management system, a first poll request as applying to the first plurality of monitored elements based on the first value and a second poll request as applying to the second plurality of monitored elements based on the second value;
   passing the first poll request directed to the first plurality of monitored elements from the administration layer to a kernel space of the data management system;
   passing the second poll request directed to the second plurality of monitored elements from the administration layer to the kernel space;
   at the kernel space, initiating polling of the first plurality of monitored elements based on the first poll request;
   at the kernel space, initiating polling of the second plurality of monitored elements based on the second poll request; and
   returning results from the second poll request to the administrative layer.

2. The method of claim 1, wherein defining the first plurality of meta-data including storage attributes is associated with capacity of the processor.

3. The method of claim 1, wherein defining the first plurality of meta-data including storage attributes is associated with paging of the memory.

4. The method of claim 1, wherein the first and the second plurality of meta-data including storage attributes include metadata related to at least one of: storage characteristics of the data storage management system, data storage presentation to at least one host, and storage attributes associated with the first plurality of monitored elements.

5. The method of claim 1, wherein the first and second values are associated with a binary flag, wherein the first value is one value of the binary flag and the second value is the other value of the binary flag.

6. The method of claim 1, wherein the first value is associated with a first range of unique identifiers to identify the first plurality of monitored elements and the second value is associated with a second range of unique identifiers to identify the second plurality of monitored elements.

7. The method of claim 1, wherein at least one of the first request or the second request is directed to a user space.

8. A data storage management system, comprising:
   a memory having stored instructions thereon that cause a machine to increase capacity of a data storage management system using meta-data by:
   defining a first plurality of meta-data including storage attributes associated with a first plurality of monitored elements;
   defining a second plurality of meta-data including storage attributes associated with a second plurality of monitored elements;
   associating a first value with the first plurality of meta-data and a second value with the second plurality of meta-data;
   interpreting, at an administration layer of the data management system, a first poll request as applying to the first plurality of monitored elements based on the first value and a second poll request as applying to the second plurality of monitored elements based on the second value;
   passing the first poll request directed to the first plurality of monitored elements from the administration layer to a kernel space of the data management system;
   passing the second poll request directed to the second plurality of monitored elements from the administration layer to the kernel space;
   at the kernel space, initiating polling of the first plurality of monitored elements based on the first poll request;
   at the kernel space, initiating polling of the second plurality of monitored elements based on the second poll request; and
   returning results from the second poll request to the administrative layer.

9. The system of claim 8, wherein the first value is associated with a first range of unique identifiers to identify the first plurality of monitored elements and the second value is associated with a second range of unique identifiers to identify the second plurality of monitored elements.

10. The system of claim 8, wherein the first request is directed to a user space and the second request is directed to kernel space.

11. The system of claim 8, wherein the second request is directed to kernel space modified to represent the first and second plurality of meta-data including storage attributes.

12. The system of claim 11, wherein processing the second request further comprises:
   processing the second request in an administration layer of the user space and directing the second request to a second driver of the kernel space to process at least a portion of the second plurality of meta-data including storage attributes.

13. An article, comprising:

a storage medium having stored instructions thereon that cause a machine to increase capacity of a data storage management system using meta-data by:

defining a first plurality of meta-data including storage attributes associated with a first plurality of monitored elements;

defining a second plurality of meta-data including storage attributes associated with a second plurality of monitored elements;

associating a first value with the first plurality of meta-data and a second value with the second plurality of meta-data;

interpreting, at an administration layer of the data management system, a first poll request as applying to the first plurality of monitored elements based on the first value and a second poll request as applying to the second plurality of monitored elements based on the second value;

passing the first poll request directed to the first plurality of monitored elements from the administration layer to a kernel space of the data management system;

passing the second poll request directed to the second plurality of monitored elements from the administration layer to the kernel space;

at the kernel space, initiating polling of the first plurality of monitored elements based on the first poll request;

at the kernel space, initiating polling of the second plurality of monitored elements based on the second poll request; and returning results from the second poll request to the administrative layer.

14. The article of claim 13, wherein the first value is associated with a first range of unique identifiers to identify the first plurality of monitored elements and the second value is associated with a second range of unique identifiers to identify the second plurality of monitored elements.

15. The method of claim 4, wherein the storage attributes include at least one of: a configuration of the first plurality of monitored elements and a state of the first plurality of monitored elements.

16. The method of claim 4, wherein the second plurality of meta-data includes data related to at least one of: the storage characteristics of the data storage management system, the data storage presentation to the at least one host, and storage attributes associated with the second plurality of monitored elements.

17. The method of claim 16, wherein the storage attributes associated with the second plurality of monitored elements includes at least one of: a configuration of the second plurality of monitored elements and a state of the second plurality of monitored elements.

* * * * *